(12) United States Patent
Werner et al.

(10) Patent No.: US 11,727,154 B2
(45) Date of Patent: Aug. 15, 2023

(54) CRYPTO DEVICE OPERATION (71) Applicant: International Business Machines Corporation, Armonk, NY (US)

(72) Inventors: Klaus Werner, Moetzingen (DE); Joerg Schmidbauer, Boeblingen (DE); Jakob Christopher Lang, Tuebingen (DE); Angel Nunez Mencias, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 96 days.

(21) Appl. No.: 17/377,589

(22) Filed: Jul. 16, 2021

(65) Prior Publication Data
US 2023/0018503 A1 Jan. 19, 2023

(51) Int. Cl.
*G06F 21/72* (2013.01)
*G06F 9/50* (2006.01)

(52) U.S. Cl.
CPC ............... *G06F 21/72* (2013.01); *G06F 9/50* (2013.01); *G06F 9/5005* (2013.01); *G06F 9/5027* (2013.01); *G06F 9/5038* (2013.01)

(58) Field of Classification Search
CPC .......... G06F 21/72; G06F 9/50; G06F 9/5005; G06F 9/5011; G06F 9/5027; G06F 9/5038; G06F 9/5066
See application file for complete search history.

(56) References Cited

U.S. PATENT DOCUMENTS

| 9,491,112 | B1 * | 11/2016 | Patel | G06F 9/5061 |
| 2016/0092243 | A1 | 3/2016 | Boenisch | |
| 2018/0374187 | A1 * | 12/2018 | Dong | G06T 1/20 |
| 2020/0104170 | A1 * | 4/2020 | Else | G06F 9/4887 |
| 2020/0293698 | A1 | 9/2020 | Sion | |
| 2020/0310875 | A1 | 10/2020 | Ragnoli | |
| 2020/0374113 | A1 | 11/2020 | Noam | |

* cited by examiner

*Primary Examiner* — D'Arcy Winston Straub
(74) *Attorney, Agent, or Firm* — Jared C. Chaney (57) ABSTRACT

Multiple work requests from different applications are queued to be processed subsequently without interruption by a crypto device. A prediction table is generated for each application to be processed by the crypto device. An initial credit value is determined for each incoming work request. The work request is an entry in an ordered queue in the order of time using respective time stamps. The next work request to be processed is selected from the entries in the queue by using the first entry in the queue for which the credit values for the corresponding application is greater than or equal to the predicted execution time for the corresponding request type in the prediction table. The selected next work request is processed.

19 Claims, 7 Drawing Sheets

CRYPTO DEVICE OPERATION

BACKGROUND

The present disclosure relates to cryptography, and more specifically, to processing data by a crypto device.

Crypto cards or hardware security modules (HSMs) are devices used to store confidential information including, for example, encryption keys (e.g., private keys, master keys, etc.). Crypto cards may be implemented using tamper-resistant hardware (e.g., crypto adapters).

SUMMARY

According to embodiments, disclosed are a method, system, and computer program product.

A crypto device is operated wherein multiple work requests from different applications are queued to be processed subsequently without interruption, the method comprising: generating a prediction table wherein multiple request types for work requests are assigned each with an initial prediction for an execution time of a work request with the corresponding request type; for each application served by the crypto device determining an initial credit value; for each incoming work request determining the corresponding application, a request type and a current time stamp and storing the determined data together with the work request as an entry in an ordered queue in the order of time using the respective time stamps; selecting the next work request to be processed from the entries in the queue by using the first entry in the queue for which the credit values for the corresponding application is greater than or equal to the predicted execution time for the corresponding request type in the prediction table; determining if a work request is being processed, and if no work request is being processed then processing the selected next work request; for each completed work request selected from the queue (i) removing the corresponding entry from the queue; (ii) determining its execution time; (iii) replacing the stored execution time for the request type of the work request in the prediction table with a value depending on the determined execution time; and (iv) reducing the credit value for the application corresponding to the work request in dependence of the determined execution time.

According to embodiments a configurable service level agreement based performance management may be used per logical partition and/or per crypto device, comprising separating work requests by request type, predictable time measures per work request per logical partition and/or per request type, pre-calculation of execution times. Work requests may be initialized with some prediction value (e.g. an experience value). Average performance costs may be used for prediction of execution times. After completion of the work request actual measurements may be used and a usage table and an average cost table (per time slice of an application in a defined time window) may be updated. A service level agreement may be established on the execution time of work requests that can be used by each client application. This may be achieved over time on average by the described computer-implemented method.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to cryptography; more particular aspects relate to processing data by a crypto device. While the present disclosure is not necessarily limited to such applications, various aspects of the disclosure may be appreciated through a discussion of various examples using this context.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

The illustrative embodiments described herein provide a device for computer-implemented method for operating a crypto device, wherein multiple work requests from different applications are queued to be processed subsequently without interruption.

The illustrative embodiments may further be used for generating a prediction table wherein multiple request types for work requests are assigned each with an initial prediction for an execution time of a work request with the corresponding request type; for each application served by the crypto device determining an initial credit value; for each incoming work request determining the corresponding application, a request type and a current time stamp and storing the determined data together with the work request as an entry in an ordered queue in the order of time using the respective time stamps; selecting the next work request to be processed from the entries in the queue by using the first entry in the queue for which the credit values for the corresponding application is greater than or equal to the predicted execution time for the corresponding request type in the prediction table; determining if a work request is being processed, and if no work request is being processed then processing the selected next work request; for each completed work request selected from the queue (i) removing the corresponding entry from the queue; (ii) determining its execution time; (iii) replacing the stored execution time for the request type of the work request in the prediction table with a value depending on the determined execution time; and (iv) reducing the credit value for the application corresponding to the work request in dependence of the determined execution time.

In some embodiments, crypto cards or hardware security modules (HSMs) may comprise crypto co-processors which are configured to store confidential information in a manner that prevents unauthorized access to the confidential information. Moreover, such a crypto card may be configured to block usage of the confidential information unless proper authentication is provided. For example, a user may not be able to use the keys stored in a crypto card if the user cannot prove that they have the right to do so. Further, in some embodiments, a crypto card may be a hardware adapter or a partition within a self-virtualizing adapter (e.g., a cryptographic domain in a crypto adapter). Further, in some embodiments, an HSM may be a co-processor that is affixed to a computer's motherboard. In addition, a single co-processor may be partitioned, so as to enable it to maintain two or more separate crypto cards at one time.

A crypto card may provide conventional hardware security functions such as cryptographic functions including key generation, hashing, signing, verification, encryption, and decryption. These operations may be performed in a variety of relevant ways.

Crypto cards may be shared between logical partitions of a computer system. Workload may be processed in the crypto card, e.g. scheduled in round-robin processes or time slice based between the different client applications. Crypto requests may vary in ranges from very fast to long running requests, some with indefinite duration (e.g. key generation). The effects may be dependent on a type of the request.

Figure 1:
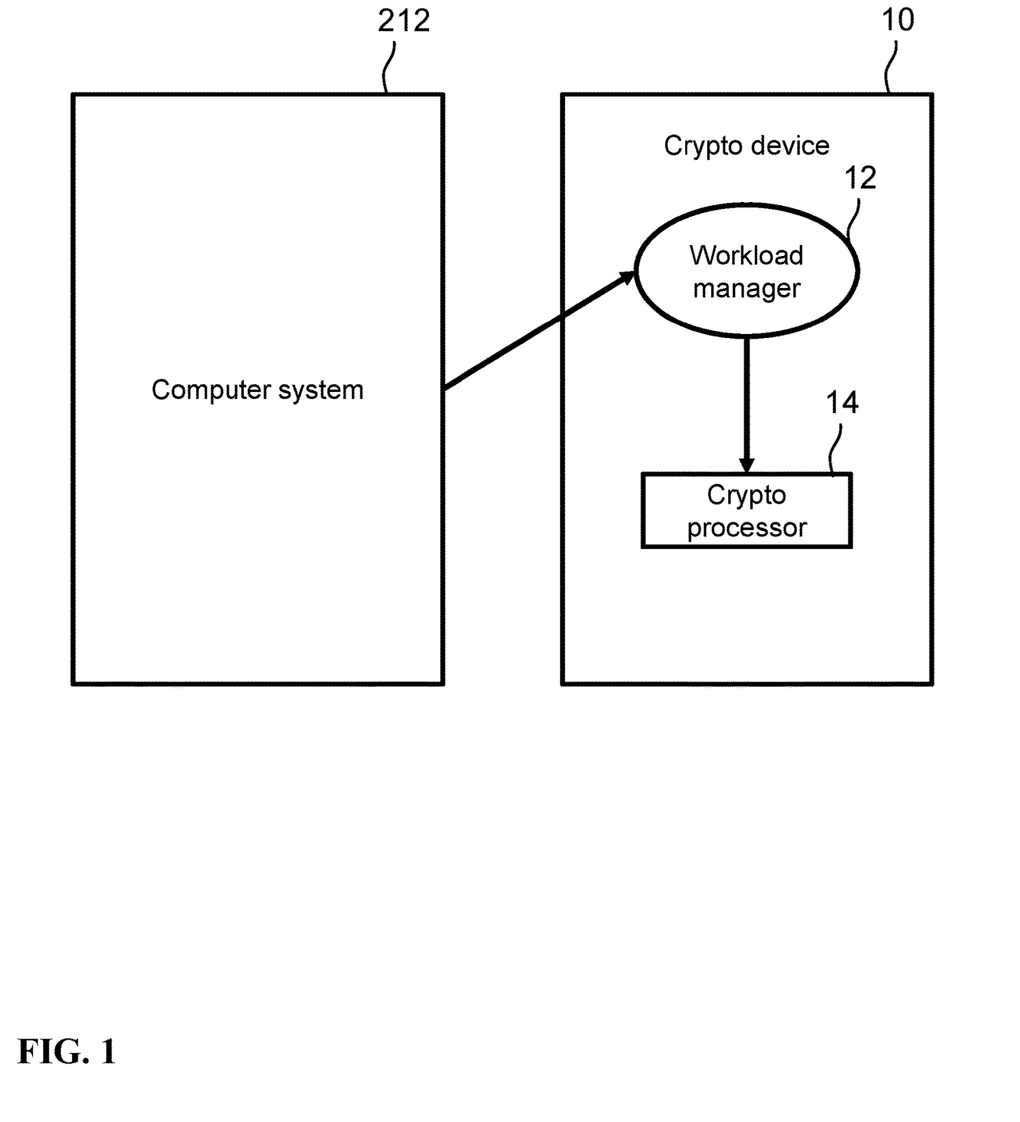
FIG. 1 depicts a schematic outline of operating a crypto device according to some embodiments of the disclosure.

FIG. 1 depicts a schematic outline of operating a crypto device according to some embodiments of the disclosure.

The crypto device 10, such as a crypto express card or a hardware security module (HSM), may be connected to a computer system 212. On the crypto device 10 the computer-implemented method may be implemented as a workload manager 12 for operating the crypto device 10. The workload manager 12 may be configured according to a service level agreement with one or more clients dispatching different client applications. The workload manager 12 may be configured to run, execute, or otherwise perform operations on a crypto processor 14 of the crypto device 10.

According to some embodiments, the method may provide means for a configurable service level agreement. The service level agreement may further be defined for a specific logical partition of a computer system 212 and/or a specific crypto device 10, respectively.

Figure 2:
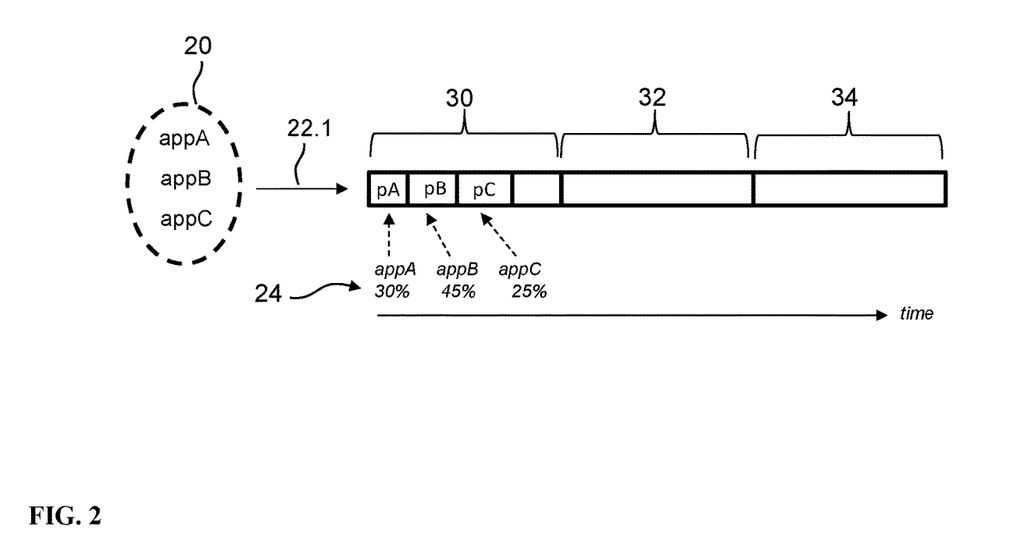
FIG. 2 depicts a first example scenario for operating a crypto device according to some embodiments of the disclosure comprising three applications each issuing a first work request.

FIG. 2 depicts a first scenario for operating the crypto device 10, depicted in FIG. 1. In accordance with some embodiments of the disclosure, the first scenario may comprise three applications 20, named appA, appB, appC, each application 20 issuing a first work request 22.1. Time slices 24 are defined as a relative share of the individual applications 20, to be used for executing work requests 22 in predefined time windows 30, 32, 34 defined by a service level agreement with a client. The time windows 30, 32, 34 thus are defined as the sum of all time slices 24 of all client applications 20. According to a service level agreement, negotiated with the owners or clients of the applications 20, application appA, e.g. has a time slice of 30% of the whole time window 30, application appB has a time slice of 45% of the whole time window 30, and application appC has a time slice of 25% of the whole time window 30. The time slices 24 may be scaled to a total length of the time window 30 of 100%.

Credit values 42 (shown in FIG. 5) are defined as a remaining time share of a client within a time window 30. According to some embodiments of the disclosure each of the applications 20 are initiated with an initial credit value 42 which is assigned to each of the applications 20, wherein the initial credit value 42 may be chosen to be equal to their individual time slice 24. According to some embodiments, each of the applications 20 are initiated with an initial credit value 42 that is less than their individual time slices 24.

In the example scenario described in the FIG. 1, the three applications 20 have issued three first work requests 22.1, using pA=20% of the time window 30 for application appA, pB=30% of the time window 30 for application appB, and pC=25% of the time window 30 for application appC. These values correspond to dimensionless execution times of the first work requests 22.1. The first work requests 22.1 are executed in a serial manner according to the time of dispatching to the workload manager 12. Each of the first work requests 22.1 is served before the next work request 22 will be executed. Predicted execution times 52 (defined in FIG. 5) may be verified after completing the work requests 22, and the predicted execution times 52 may be corrected and/or confirmed. After completion of the first work requests 22.1 credit values 42 for the three applications 20 may be adjusted based on the initial credit value 42 and based on the actual percentage used of the time window. For example, based on the usage of time window 30 in the first example scenario the credit values 42 may be updated as follows: for application appA, 30−20=10; for application appB, 45−30=15; and for application appC, 25−25=0.

Figure 3:
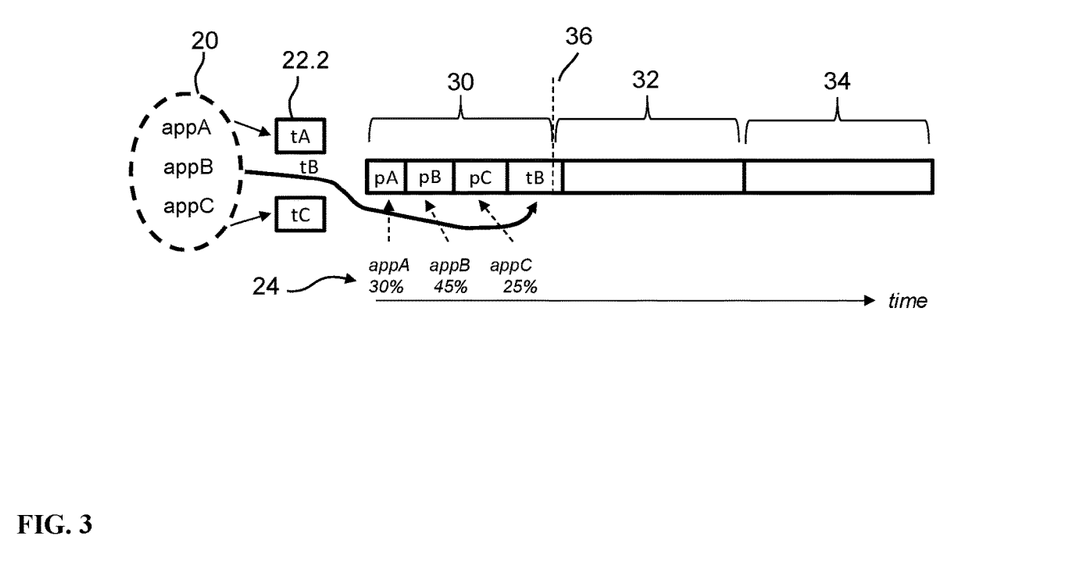
FIG. 3 depicts a second example scenario for operating a crypto device according to some embodiments of the disclosure comprising the three applications each issuing a second work request.
Figure 5:
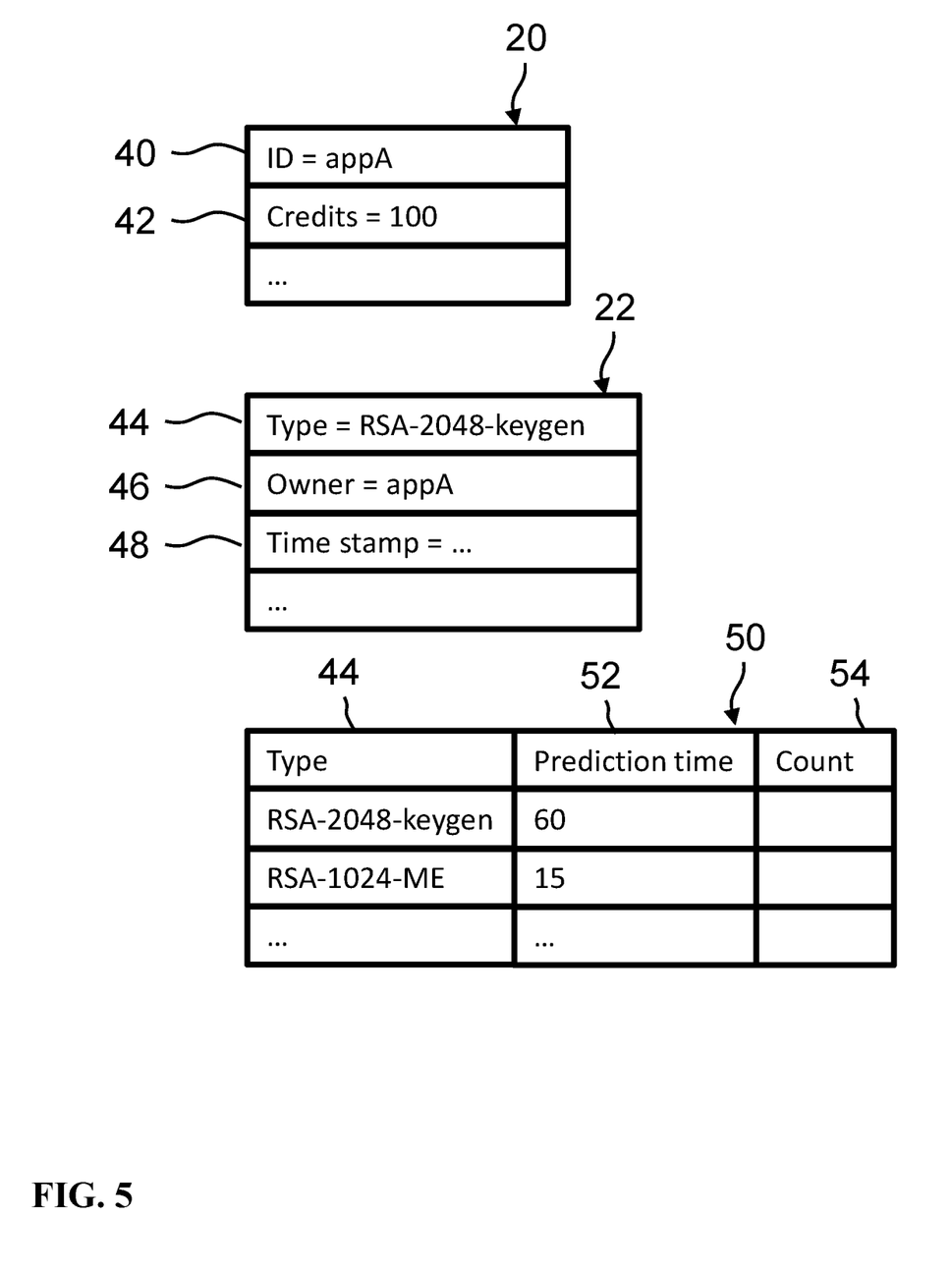
FIG. 5 depicts definitions of applications, work requests and a prediction table according to some embodiments of the disclosure.

In FIG. 3 a second example scenario for operating the crypto device 10 is depicted comprising the three applications 20 each issuing a second work request 22.2. In the second example scenario, shown predicted execution times 52 may be the same for all three second work requests 22: e.g., a value of tA=tB=tC=30.

Because the credit value 42 of application appB exhibits the highest value of 15, after completion of the first work request 22.1, the second work request 22.2 of application B may be served first.

Execution of the second work request 22.2 of application appB with a value of tB=30 may exceed the limit of the first time window 30. As a result of exceeding the time limit of the first time window 30, tB may take a small time step, e.g., time step of 5, from the second time window 32. The original window border 36 is marked by a broken line in FIG. 3.

As a result, after completion of the second work request 22.2 of application appB the credit values 42 of all applications 20 are increased by a value of the initial credit value 42 and subtracted by any additional operations (e.g., second, third, multiple operations) within the given time window (e.g., time window 32). In the second example scenario, the updated credit values 42 now are for application appA: 10+30=40, for application appB: 15−30+45=30, for application appC: 0+25=25. With these new credit values 42 the remaining work requests 22 (e.g., additional work requests after the first work request 22.1 and the second work request 22.2) are evaluated for issuing the next work request 22.*n*.

Figure 4:
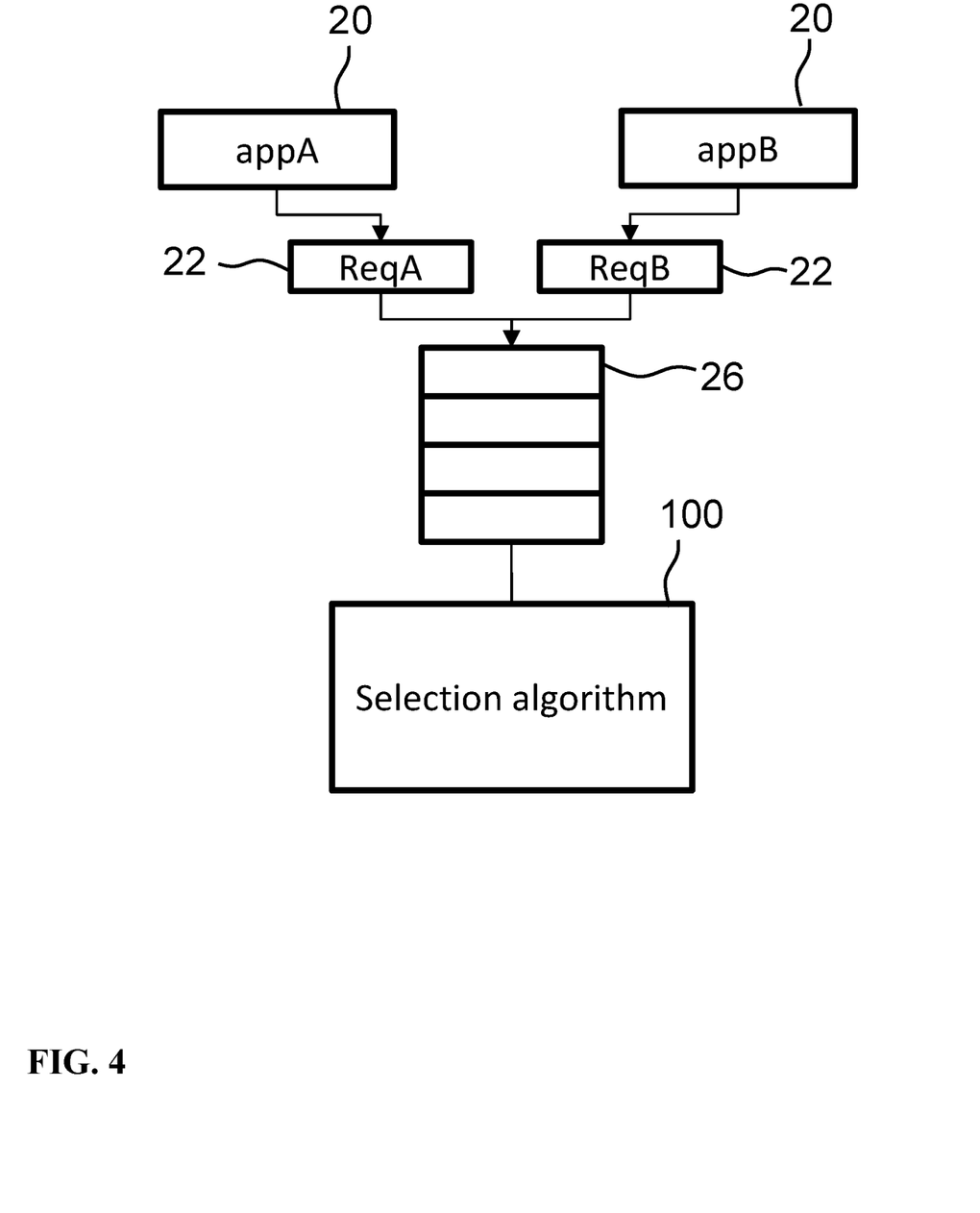
FIG. 4 depicts an overall workflow for operating a crypto device according to some embodiments of the disclosure.

FIG. 4 depicts an overall workflow for operating the crypto device 10 according to some embodiments of the disclosure, whereas FIG. 5 depicts definitions of applications 20, work requests 22, and a prediction table 50 according to some embodiments of the disclosure.

Work requests 22 from two applications 20 (appA, appB) may be issued and stored with corresponding time stamps 48 in an ordered queue 26. Then selection algorithm 100 of the workload manager 12 may operate for the crypto device 10. According to some embodiments, an order of the work requests 22 in the ordered queue 26 may be defined by appearance of work requests 22 according to their time stamps 48. Stated another way, in some embodiments, the one or more entries are ordered based on the determine current time stamp, while in some other embodiments, the one or more entries may be ordered by an initial time stamp.

Each application 20 may be characterized by an identifier 40, in FIG. 5, e.g., "ID=appA" and by the corresponding credit value 42, "credits=100".

A work request 22 may at least be characterized by the request type 44, in FIG. 5, e.g. "Type=RSA-2048-keygen" for a key generation request, by an owner 46, "owner=appA", and by the time stamp 48, "time stamp= . . . ". A request type 44 may be at least one of symmetric, asymmetric, key generation, request, reply, or other relevant function.

In the prediction table 50 the different work requests 22 may at least be characterized by their request type 44, by the predicted execution time 52 and by a count value 54. In the example in FIG. 5 first there is a request type 44 of "RSA-2048-keygen" with a predicted execution time 52 of 60, and second a request type 44 of "RSA-1024-ME" with a predicted execution time 52 of 15.

Figure 6:
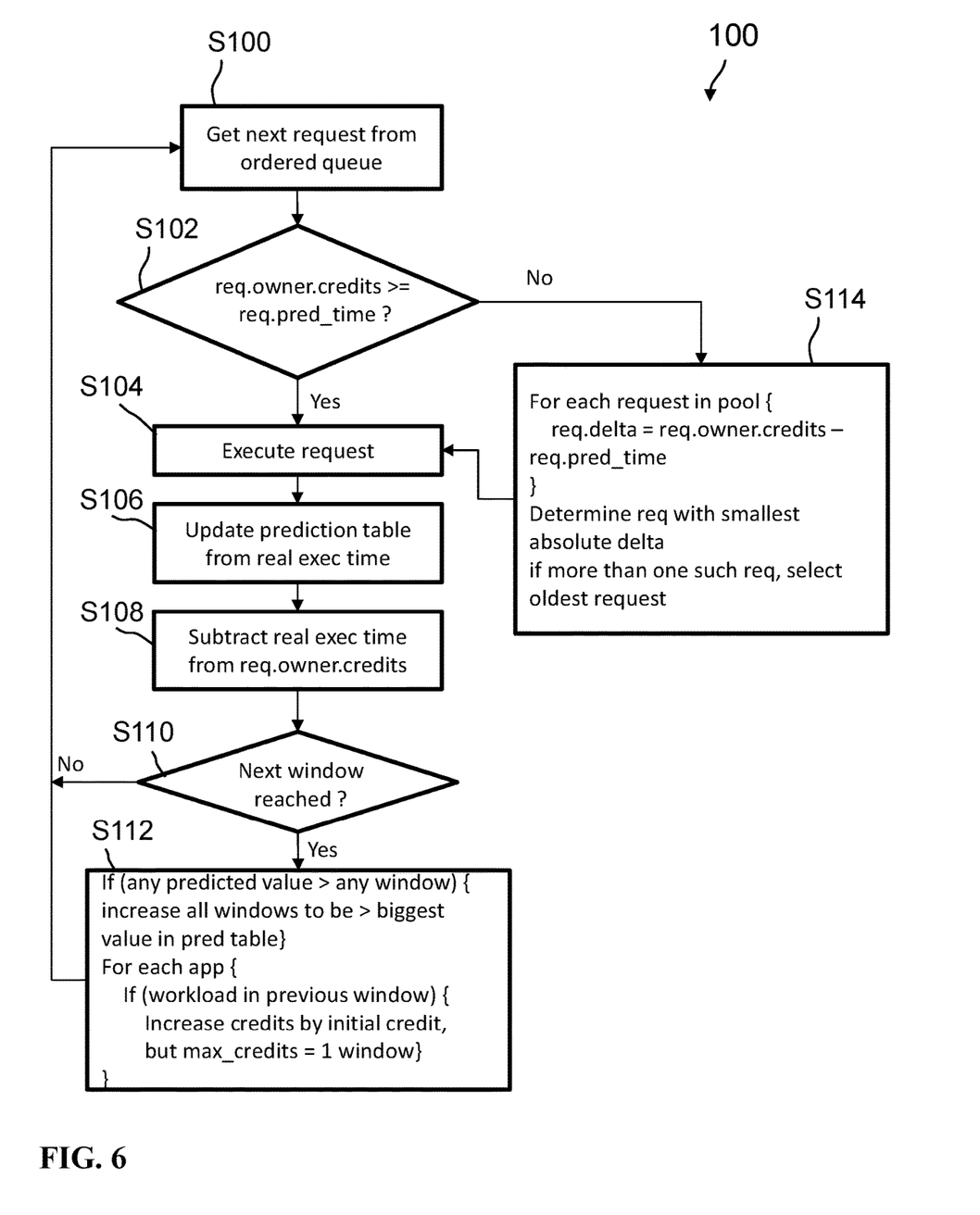
FIG. 6 depicts a flow chart of the computer-implemented method for operating a crypto device according to some embodiments of the disclosure.

FIG. 6 depicts a flow chart of the computer-implemented method 100 for operating the crypto device 10 according to some embodiments of the disclosure. The selection algorithm 100 shown in FIG. 4 for operating the crypto device 10, wherein multiple work requests 22 from different applications 20 are queued to be processed subsequently without interruption.

According to embodiments of the method, a prediction table 50 as shown in FIG. 5, may be generated wherein multiple request types 44 for work requests 22 are assigned each with an initial prediction for the execution time 52 of a work request 22 with the corresponding request type 44. For each application 20 served by the crypto device 10 an initial credit value 42 may be determined. For each incoming work request 22 the corresponding application 20, a request type 44 and a current time stamp 48 may be determined. The determined data may be stored together with the work request 22 as an entry in an ordered queue 26 in the order of time using the respective time stamps 48.

The next work request 22 to be processed may be selected from the entries in the queue 26 (step S100) by using the first entry in the queue 26 for which the credit values 42 for the corresponding application 20 is greater than or equal to the predicted execution time 52 for the corresponding request type 44 in the prediction table 50 (step S102).

It is determined if a work request 22 is being processed, and if no work request 22 is being processed then the selected next work request 22 may be processed in step S104.

For each completed work request 22 selected from the queue 26 the corresponding entry may be removed from the queue 26, its execution time may be determined and the stored execution time for the request type 44 of the work request 22 in the prediction table 50 may be updated with a value depending on the determined execution time, step S106.

In step S108 the credit value 42 for the application 20 may be reduced corresponding to the work request 22 in dependence of the determined execution time.

According to some embodiments, for each completed work request 22 it may be determined, if the current time is outside of the predefined time window 30, and in that case the credit values 42 for all served applications 22 may be increased by a value of the initial credit values 42.

Therefore, in step S110 it is determined if the next window 32 is reached. If this is not the case, the loop may be reentered by step S100 getting the next work request 22 from the ordered queue 26.

Step S102 may include a query if the credit value 42 of the corresponding application 20 for the next work request 22 exceeds the predicted execution time 52 of the work request 22 to be executed. If this is the case the work request 22 is executed as described above in step S104.

If a predicted execution time 52 exceeds the credit value 42 of the corresponding application 20, then the credit values 42 of all applications 20 may be increased by a value of the corresponding initial credit values 42. If the credit value 42 for the corresponding application 20 of the next work request 22 is less than the predicted execution time 52, step S114 is executed, where for each work request 22 in the queue 26 a difference between the current credit value 42 of the owning application (20) and the predicted execution time 52 may be determined. Next the work request 22 with the smallest absolute difference may be determined. If there is more than one work request 22 with this smallest absolute difference, the oldest work request 22 with this smallest absolute difference according to the time stamp 48 may be selected.

Then the flow of method 100 may be continued in step S104, by executing the selected work request 22.

If in step S110 the next time window 32 is reached, then, in step S112, the credit values 42 for all served applications 20 may be increased by a value of their initial credit values 42, if the completed work request 22 started in the previous window 30.

Alternatively, if the predicted execution time 52 of all applications 20 exceeds the value of the time window 30, then the credit values 42 for all served applications 20 may be increased by at least the greatest of all predicted execution times 52 in the prediction table 50.

According to some embodiments, the time window 30 may be defined such that it exceeds the greatest value of the predicted execution times 52 of the applications 20. Such as to consider a situation where a given application 20 with a small time slice 24 would not be able to process a big work request 22 at all. As a consequence, if the predicted execution time 52 of a work request 22 exceeds the time window 30, the time window 30 may be adapted to the predicted execution time 52.

According to some embodiments, if a predicted execution time 52 is greater than the time window 30, then the size of time window 30 is increased to be greater than any predicted execution times 52. The size of the time window 30 may be increased by the greatest value of the predicted execution times 52 of all work requests 22 in the prediction table 50.

According to some embodiments, if the predicted execution time 52 exceeds a value of the time window 30, the credit values 42 may be increased by a value of the initial credit values 42. In some embodiments, a credit value 42 may not be greater than the length of a time window 30.

According to some embodiments, if a work request 22 of an application 20 is not executed in the time window 30, then the credit value 42 of the application 20 may be increased by a bonus value. This increase by a bonus value may cause the work request 22 of the application 20 to be dispatched after some time windows 30, 32, 34.

Figure 7:
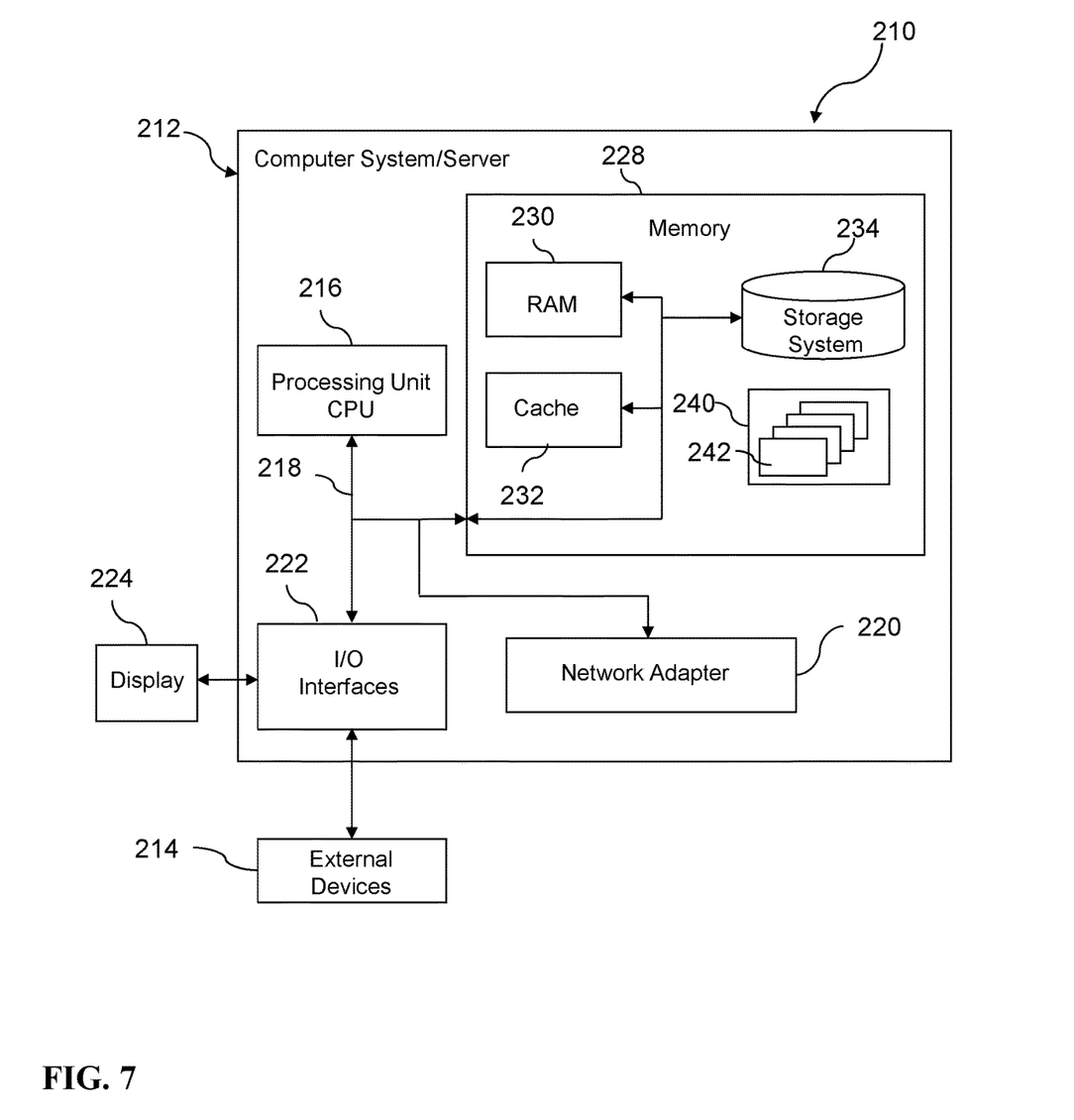
FIG. 7 depicts an example embodiment of a data processing system for executing a method according to some embodiments of the disclosure.

Referring now to FIG. 7, a schematic of an example of a data processing system 210 is shown. Data processing system 210 is only one example of a suitable data processing system and is not intended to suggest any limitation as to the scope of use or functionality of embodiments of the invention described herein. Regardless, data processing system 210 is capable of being implemented and/or performing any of the functionality set forth herein above.

In data processing system 210 there is a computer system/server 212, which is operational with numerous other general-purpose or special-purpose computing system environments or configurations. Examples of well-known computing systems, environments, and/or configurations that may be suitable for use with computer system/server 212 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216.

Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 218 by one or more data media interfaces. As will be further depicted and described below, memory 228 may include at least one program product having a set (e.g., at least one) of program modules that are configured to carry out the functions of embodiments of the disclosure.

Program/utility 240, having a set (at least one) of program modules 242, may be stored in memory 228 by way of example, and not limitation, as well as an operating system, one or more application programs, other program modules, and program data. Each of the operating system, one or more application programs, other program modules, and program data or some combination thereof, may include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Still yet, computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for operating a crypto device, wherein multiple work requests from one or more applications are queued to be processed by the crypto device, the method comprising:
generating a prediction table that includes multiple request types that correspond to the multiple work requests;
assigning, each of the multiple request types in the prediction table, a predicted execution time, wherein the predicted execution time corresponds to a type value of each of the multiple request types;
determining, for each application of the one or more applications, a credit value;
storing, for each application of the one or more applications, the credit value as an initial credit value;
determining, for each work request of the multiple work requests, a corresponding application of the one or more applications, a request type, and a current time stamp;
storing, for each work request of the multiple work requests, one or more entries in an ordered queue, wherein each entry of the one or more entries includes the determined corresponding application, the determined request type, and the determined current time stamp;
selecting, from the ordered queue and in response to the credit value being greater than or equal to the predicted execution time, a queued work request to be processed by the crypto device to create a selected work request;
processing, in response to determining none of the multiple work requests are being processed, the selected work request to create a processed work request;
removing an entry of the one or more entries in the ordered queue that corresponds to the processed work request;
determining a first execution time of the processed work request; and
reducing, based on the first execution time, the credit value to create an updated credit value for the application of the one or more applications.

2. The method according to claim 1, further comprising:
determining, for each entry and in response to the credit value being less than the predicted execution time, a set of candidate entries from the ordered queue, wherein each of the candidate entries includes a difference between the corresponding credit values of each entry and the predicted execution time;
determining, from the set of candidate entries, a subset of the set of candidate entries that share a smallest absolute difference of the differences;
selecting, from the subset of the set of candidate entries, a second work request that corresponds to an entry with a determined current time stamp that is older than the other determined current time stamps of the subset of the set of candidate entries; and
processing the second work request.

3. The method according to claim 1, wherein a plurality of time slices are defined as a relative share of the applications to be used for executing work requests in a predefined time window that represents a sum of the time slices of the applications.

4. The method according to claim 3, wherein the method further comprises:
determining a first determined subset of completed work requests that have a determined current time stamp outside of the predefined time window; and
increasing the credit values for all applications that correspond to the first determined subset, by the corresponding stored initial credit values.

5. The method according to claim 3, wherein the method further comprises:
increasing, in response to an aggregate of all predicted execution times of the queue entries exceeding the predefined time window, the credit values for all applications by at least the greatest predicted execution time of all predicted execution times in the prediction table.

6. The method according to claim 3, wherein the method further comprises:
increasing, in response to a predicted execution time of a given entry in the ordered queue exceeding the corresponding credit value of the given entry, the credit values for all applications by the corresponding stored initial credit values.

7. The method according to claim 3, wherein the predefined time window is defined such that it exceeds the greatest value of the predicted execution times of the applications.

8. The method according to claim 3, wherein the method further comprises:
increasing, in response to all of the predicted execution times being greater than the predefined time window, the predefined time window.

9. The method according to claim 3, wherein the method further comprises:
increasing, if a given predicted execution time of an entry exceeds a value that corresponds to the predefined time window, the credit value of all entries in the queue by the corresponding initial credit values.

10. The method according to claim 3, wherein the initial credit value is chosen to be equal to the time slice of the corresponding application.

11. The method according to claim 1, wherein an order of the work requests in the ordered queue is defined by appearance of work requests according to time stamps to the queue.

12. The method according to claim 1, wherein the method further comprises:
increasing, if a given application is not executed in a predefined time window, the credit value of a work request that corresponds to the application by a bonus value.

13. The method according to claim 1, wherein the request type for a given work request is selected from the group consisting of a symmetric, an asymmetric, a key generation, a request, and a reply.

14. The method according to claim 1, wherein the method further comprises:
providing a configurable service level agreement for performing the work requests.

15. The method according to claim 14, wherein the service level agreement is defined for a specific logical partition of a computer system.

16. The method according to claim 14, wherein the service level agreement is defined for a specific logical partition of the crypto device.

17. The method according to claim 1, implementing the method as a workload manager on the crypto device.

18. A system, the system comprising:
a memory, the memory containing one or more instructions; and
a processor, the processor communicatively coupled to the memory, the processor, in response to reading the one or more instructions, configured to:

generate a prediction table that includes multiple request types that correspond to multiple work requests;

assign, each of the multiple request types in the prediction table, a predicted execution time, wherein the predicted execution time corresponds to a type value of each of the multiple request types;

determine, for each application of one or more applications, a credit value;

store, for each application of the one or more applications, the credit value as an initial credit value;

determine, for each work request of the multiple work requests, a corresponding application of the one or more applications, a request type, and a current time stamp;

store, for each work request of the multiple work requests, one or more entries in an ordered queue, wherein each entry of the one or more entries includes the determined corresponding application, the determined request type, and the determined current time stamp;

select, from the ordered queue and in response to the credit value being greater than or equal to the predicted execution time, a queued work request to be processed by a crypto device to create a selected work request;

process, in response to determining none of the multiple work requests are being processed, the selected work request to create a processed work request;

remove an entry of the one or more entries in the ordered queue that corresponds to the processed work request;

determine a first execution time of the processed work request; and reduce, based on the first execution time, the credit value to create an updated credit value for the application of the one or more applications.

19. A computer program product, the computer program product comprising:

one or more computer readable storage media; and program instructions collectively stored on the one or more computer readable storage media, the program instructions configured to:

generate a prediction table that includes multiple request types that correspond to multiple work requests;

assign, each of the multiple request types in the prediction table, a predicted execution time, wherein the predicted execution time corresponds to a type value of each of the multiple request types;

determine, for each application of one or more applications, a credit value;

store, for each application of the one or more applications, the credit value as an initial credit value;

determine, for each work request of the multiple work requests, a corresponding application of the one or more applications, a request type, and a current time stamp;

store, for each work request of the multiple work requests, one or more entries in an ordered queue, wherein each entry of the one or more entries includes the determined corresponding application, the determined request type, and the determined current time stamp;

select, from the ordered queue and in response to the credit value being greater than or equal to the predicted execution time, a queued work request to be processed by a crypto device to create a selected work request;

process, in response to determining none of the multiple work requests are being processed, the selected work request to create a processed work request;

remove an entry of the one or more entries in the ordered queue that corresponds to the processed work request;

determine a first execution time of the processed work request; and reduce, based on the first execution time, the credit value to create an updated credit value for the application of the one or more applications.

* * * * *